United States Patent [19]
Junier

[11] Patent Number: 4,899,899
[45] Date of Patent: Feb. 13, 1990

[54] PRESSURE VESSEL
[75] Inventor: Marius R. Junier, Houston, Tex.
[73] Assignee: Triten Corporation, Houston, Tex.
[21] Appl. No.: 370,233
[22] Filed: Jun. 21, 1989
[51] Int. Cl.⁴ ............................................. F16J 15/14
[52] U.S. Cl. ....................................................... 220/3
[58] Field of Search ............... 220/3, 466; 339/268 R, 339/268 S, 263 R; 277/22

[56] References Cited
U.S. PATENT DOCUMENTS

| | | | |
|---|---|---|---|
| 4,560,232 | 12/1985 | O'Hara | 220/3 |
| 4,561,568 | 12/1985 | Hoffmeister et al. | 220/3 |
| 4,582,212 | 4/1986 | Asari | 220/3 |
| 4,582,217 | 4/1986 | Proctor et al. | 220/3 |
| 4,653,663 | 3/1987 | Holtsclaw | 220/3 |
| 4,793,491 | 12/1988 | Wolf et al. | 220/3 |
| 4,844,274 | 7/1989 | Sterk | 220/3 |

Primary Examiner—Joseph Man-Fu Moy
Attorney, Agent, or Firm—Vaden, Eickenroht, Thompson & Boulware

[57] ABSTRACT

There are disclosed two embodiments of a stuffing box for a movable stem of a valve, wherein each stuffing box includes first and second primary packing assemblies at its inner and outer ends, respectively, a third packing assembly intermediate the first and second packing assemblies and including axially spaced inner and outer packing sections between which sealant may be injected, as well as a bleed ring intermediate the first and second packing sections and surrounding the stem with small clearance, whereby purge fluid may be introduced into the small clearance for flow past the inner primary packing assembly in the event it fails.

8 Claims, 2 Drawing Sheets

FIG. 2
FIG. 3
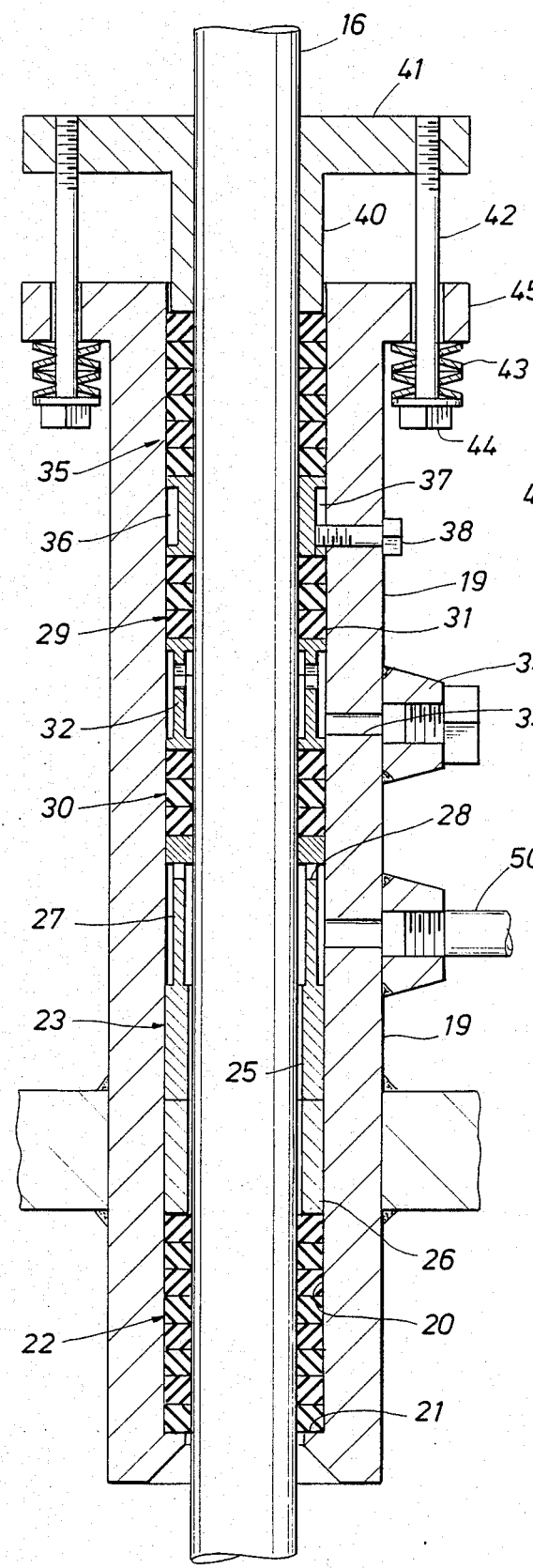
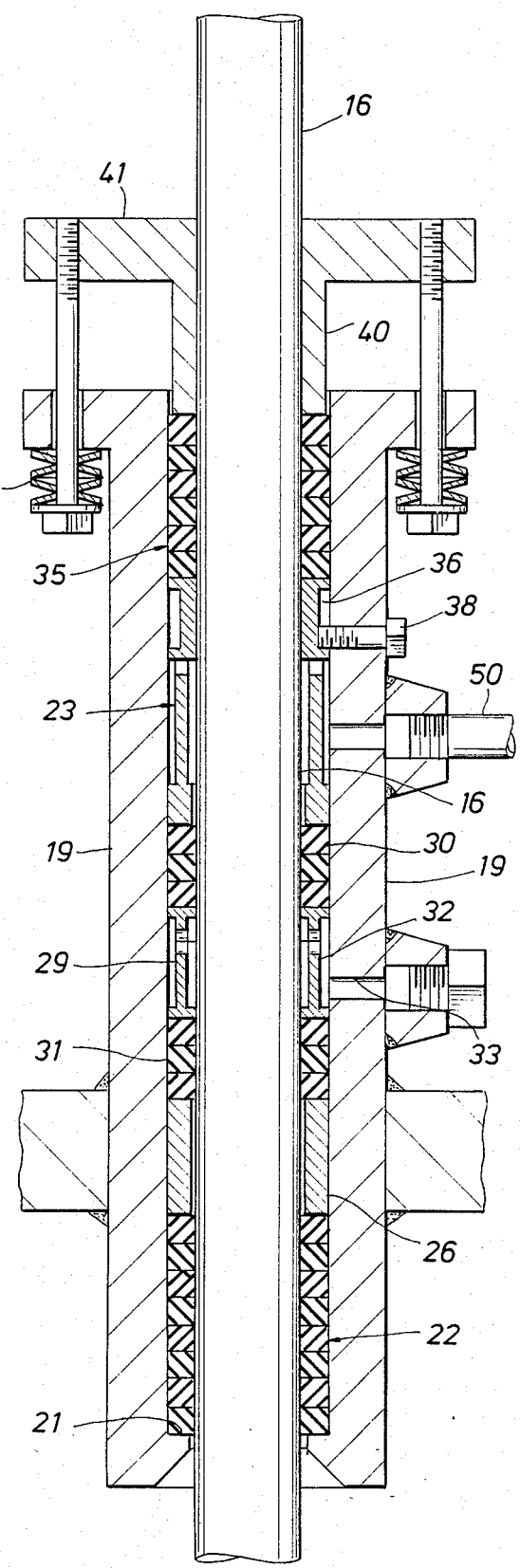

PRESSURE VESSEL

This invention relates generally to a pressure vessel comprising a body in which fluid may be contained under pressure and a movable rod through a stuffing box mounted on the body to seal about the rod. More particularly, it relates to improvements in a pressure vessel of this type wherein the stuffing box includes a secondary packing assembly having axially spaced, inner and outer packing sections arranged inwardly of a primary packing assembly, and means for limiting outward movement of the outer section and injecting sealant between the sections whereby the primary assembly may be removed for replacement or repair while the vessel remains in service. In accordance with the illustrated embodiments of the invention, the pressure vessel is a valve and the rod is a stem which extends through a stuffing box mounted in the valve body for moving a closure member in the body between opened and closed positions.

In a prior slide valve of this type, a metal bleed ring having an inner diameter which surrounds the stem with small clearance is arranged inwardly of the secondary packing to guide the stem, and a means is provided for injecting a purge fluid into the clearance at a pressure somewhat above the pressure of fluid in the valve body so as to force it to flow past the bleed ring and into the valve body and thus protect the primary packing assembly from fluids in the valve body as well as prevent solids estrained therein from damaging the stem. It has been found, however, that the stem tends to rub and damage the bleed ring, thus ultimately causing the stem to be stuck. Also, in prior valves of this latter type, difficulties have been encountered in controlling the purge fluid, excessive purging causing damage or erosion of the stem and insufficient purging permitting entry of solid particles into the clearance which might cause the valve stem to stick.

An object of this invention is to provide a pressure vessel such as a valve of this type having a stuffing box of such construction as to overcome one or more of these problems.

Another object is to provide a pressure vessel such as a valve of this type wherein the stuffing box is of such construction as to reduce the likelihood of the rod or stem becoming stuck, while at the same time retaining the ability to circulate purge fluid into the body in the event it is needed to contain fluid therein.

Still another object is to provide a pressure vessel such as a valve of this type in which the circulation of purge fluid past the bleed ring may be monitored in such a manner as to control its pressure and flow rate into the valve body.

These and other objects are accomplished, in accordance with the illustrated embodiments of the invention, by a pressure vessel such as a valve in which the stuffing box which surrounds the rod such as a stem connecting with the valve closure member includes a first primary packing assembly at its inner end, a second primary packing assembly at its outer end, and a bleed ring intermediate the first and second primary packing assemblies, together with means for injecting purge fluid into the small clearance within the bleed ring at a pressure above that being controlled in the valve body. In a valve having a stuffing box of this construction, the inner, primary packing assembly not only serves to contain fluid within the body and protect the secondary and outer, primary packing assemblies from damage, but also to guide the stem in order to prevent it from being damaged by the bleed ring. On the other hand, purge fluid injected into the small clearance about the stem serves to further energize the inner primary packing, and, in the event the inner primary packing fails, circulate therepast and into the valve body in order to contain the fluid in the valve body.

In accordance with the preferred and illustrated embodiment of the invention, purge fluid is injected into the small clearance between the bleed ring and the stem by means which includes a conduit for connecting the clearance with a source of purge fluid, valve means for opening and closing the conduit, and thus selectively supplying purge fluid to the clearance, and means for controlling the pressure of the purge fluid from the source, and thus maintaining a desired differential pressure above that of the fluid contained in the valve body. More particularly, a means is provided for restricting flow within the conduit intermediate the pressure controlling means and valve means, and for measuring and indicating the pressure of the purge fluid as well as its rate of flow within the conduit intermediate the flow restricting means and valve means, and thus maintaining proper control over the purge fluid.

In the drawings, wherein like reference characters are used throughout to indicate like parts:

FIG. 2 is an enlarged, vertical sectional view of the stuffing box shown in FIG. 1; and FIG. 3 is another enlarged, vertical sectional view of a stuffing box constructed in accordance with an alternative embodiment of the present invention.

Figure 1:
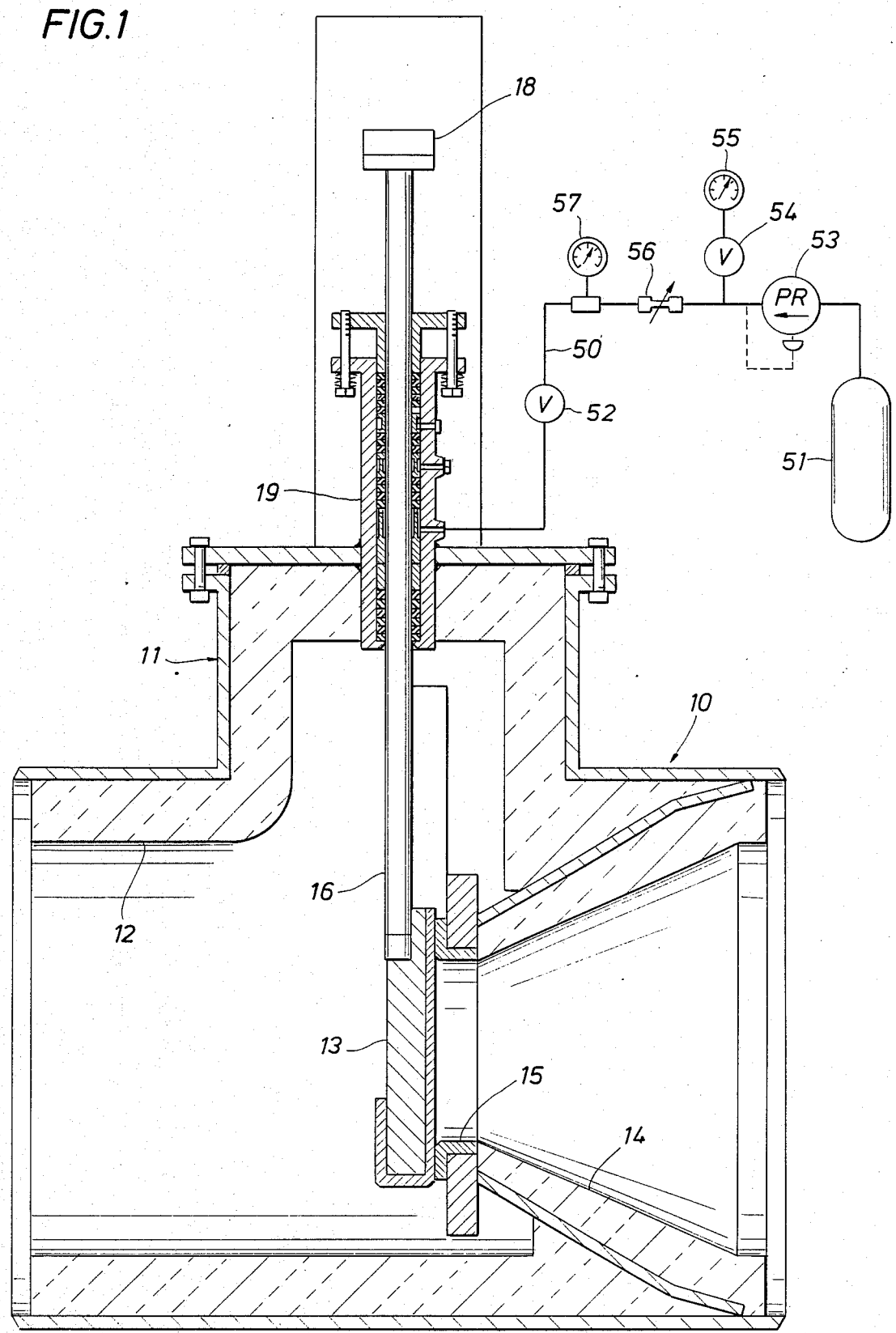
FIG. 1 is a longitudinal sectional view of a slide valve including a stuffing box constructed in accordance with one embodiment of the present invention, and illustrating diagrammatically a system for injecting purge fluid into the clearance within a bleed ring of the stuffing box.

With reference now to the details of the above described drawings, the valve shown in FIG. 1, and indicated in its entirety by reference character 10, comprises a valve body 11 having a flow way 12 therethrough and a closure member 13 movable within the valve body for opening and closing the flow way. In the illustrated valve, fluid flows from right to left and thus enters an inwardly tapered section 14 having a restricted opening 15 at its inner end, and the closure member 13 is connected to the inner end of a stem 16 which extends outwardly of the body to a coupling 18 on its end which is adapted to be connected to an operator or actuator mounted on a yoke above the valve body. More particularly, the stem has a "T" on its end which fits within a "T" slot in the closure member and the closure member is received in guide slots in the sides of the valve body to mhold it connected to the stem, whereby the closure member may be reciprocated between the closed position shown in FIG. 1 and an open position above the opening 15. The illustrated valve is particularly adapted for controlling fluids at a high temperature and of a corrosive nature, and hence the inside of the valve body is lined with a highly heat and corrosion resistant material.

The stem 16 extends through a stuffing box including a tubular member 19 mounted within the upper end of the valve body to form an annular space about the stem 16. As shown in FIG. 2, the lower or inner end of the tubular member has a seat 21 formed thereon, and the upper and outer end thereof is open to permit the packing assemblies and other parts to be stacked within the space. Thus, a first, inner packing assembly 22 is supported on the seat with the packing elements thereof closely received about the stem and within the inner diameter 20 of the tubular member 19. A bleed ring 23 is supported within the space above the inner primary packing assembly 22 and has an inner diameter 25 which surrounds the stem with small clearance, and the tubular member 19 has a port 24 formed therein generally opposite the bleed ring to permit purge fluid to be introduced into the clearance from a suitable source connected thereto in a manner to be described hereinafter. A spacer or backup ring 26 is disposed intermediate the purge ring and inner packing assembly, although the backup ring may be formed integrally with the bleed ring.

The bleed ring includes an upper section 27 of reduced thickness so as to form a somewhat larger clearances between it and the inner diameter 20 of the tubular member and the stem 16. The upper end of the section 27 is slotted or otherwise provided with holes 28 through which purge fluid may flow from the outer side of the reduced section 27 to the inner side thereof and thus into the clearance 25. The disposal of the upper section opposite the port 24 in the tubular member 19 deflects the purge fluid might otherwise damage the stem.

The stuffing box further includes a secondary packing assembly 29 disposed within the space between the tubular member and stem above the purge ring 23. As previously described, the secondary packing assembly includes inner and outer or lower and upper sections 30 and 31 having packing elements similar to those of packing assembly 22 and a spacer ring 32 disposed between them. The spacer ring is located generally opposite a port 33 formed in the tubular member and through which sealant may be injected into the space between the packing assembly sections 30 and 31. More particularly, the spacer ring 32 has a reduced intermediate portion providing larger clearances between it and the inner diameter of the tubular member and the stem, and has ports 34 formed therein to permit sealant injected through the port 33 to 34 to fill the space between the packing assembly sections 30 and 31 and stem with sealant. It will be understood that the sealant may be supplied to the port 33 through a suitable fitting connected thereto, as indicated in broken lines. The ring 31 is shown to comprise split sections having flanges on their ends which are urged away from one another to further energize the sections 30 and 31 as sealant is introduced between them.

The stuffing box also includes an outer or upper primary packing assembly 35 disposed within the outer end of the space between the stem and tubular body above the secondary packing assembly 29. This second primary packing assembly, which is similar to the first primary packing assembly 22 in that it is made up of a series of stacked packing elements which are closely received in the space between the tubular member and stem, is seated upon the upper end of a ring 36 which is supported on the upper end of the upper section 31 of the secondary packing assembly.

The ring 36 has an annular recess 37 about its outer diameter to receive the inner end of a bolt 38 extending threadedly through the tubular member with its inner end generally opposite the lower end of the recess 37. Thus, the bolt 38, when in its inner position, holds the secondary packing assembly in place as sealant is injected through the port 33 to permit the outer or upper primary packing assembly 35 to be replaced. Also, of course, the bolt 38 may be backed out of the recess 37 to permit the ring 36 as well as the secondary and primary packing assemblies as well as the purge ring to be removed from within the space between the tubular member and stem.

The stacked packing assemblies are axially compressed in order to cause them to expand radially inwardly and outwardly into sealing engagement with the stem and inner diameter of the tubular member. For this purpose, a ring 40 fitting within the upper end of the space above the outer packing assembly 35 is adapted to be yieldably urged inwardly to so compress the packing assemblies by means of a flange 41 on its outer end connected to rods 42 yieldably urged inwardly or downwardly by means of spring washers 43 between nuts 44 on the lower ends of the rod and the lower side of a flange 45 at the outer end of the tubular member through which the rods extend. The nuts 44 may be tightened as desired to increase the downward force on the packing assemblies.

On the other hand, the nuts may be removed to permit the ring 40 to be lifted from within the upper end of the space to permit replacement of the outer primary packing 35, or, alternatively, upon withdrawal of bolt 38, the secondary packing assembly and the lower inner primary packing assembly as well as the purge ring. Upon assembly of the stuffing box, the ring 40 may be forced inwardly to a position in which bolt 38 may move into the lower end of slot 37 to maintain sealing engagement of the secondary packing sections with the stem and inner diameter of the tubular member.

From the foregoing description, it will be understood that the lower or inner primary packing assembly not only guides the stem and thus keeps it from rubbing against the inner diameter of the purge ring, but also contains fluid within the valve body. The packing elements of this assembly may of course be made of whatever materials are best suited to resisting damage by the contained fluid. During this time, the purge fluid is contained between the upper end of the primary packing assembly 22 and the lower section 30 of the secondary packing assembly 29 at a pressure somewhat above that of the fluid being contained in the valve 25, thus further energizing the inner primary packing assembly as well as the inner section 30 of the secondary packing assembly. In the event, however, that the inner packing assembly fails, purge fluid will flow through the clearance 25 and past the packing assembly 22 into the valve body to prevent the contained fluid from escaping from the valve body.

Purge fluid is supplied into the port 24 by a system including, as shown in FIG. 1, a conduit 50 having its outer end connected to a container 51 of nitrogen or other fluid suitable for this purpose and having a valve 52 being installed therein near its connection to the port 24 in order to open and close it. The system also includes a pressure regulator 53 installed in the conduit 50 near the container 51, whereby the pressure of the purge fluid from the container may be maintained at a desired value. The flow rate of purge fluid from the pressure regulator 53 is measured by an instrument 54 indicated on a visual gauge 55 connecting to the instrument. A flow restricter 56 is installed in the conduit downstream of the flow rate indicator, and a pressure indicator 57 is installed between the restricter and the valve 52. As previously indicated, this system, including the above described instruments, enables an operator to maintain the necessary control over the pressure of the purge fluid, thus assuring that the pressure thereof is maintained at the proper level.

The embodiment of the stuffing box illustrated in FIG. 3 is in many respects similar to that illustrated in FIG. 2. In fact, it may comprise a combination of primary and secondary packing assemblies and a purge ring identical to those parts of the packing assembly of the stuffing box of FIG. 2, but rearranged within the space between the stem 16 and the inner diameter of the tubular member 19 in a direction from the inner to the outer end of the space.

Thus, as shown in FIG. 3, the primary packing assembly 22 as well as the spacer ring 26 are, as in the case of the corresponding elements of the stuffing box in FIG. 2, arranged within the inner end of the space, with the packing assembly 22 being supported on the seat 21 at the inner end of the tubular member. However, the axial positions of the secondary packing assembly and purge ring are reversed in that the secondary packing assembly 29 is supported on the spacer ring 26 above the packing assembly 22, and the purge ring 23 is supported above the upper packing assembly section 30 of the secondary packing assembly. To accommodate this reversal of positions, the port 24 into which purge fluid is injected is formed in the tubular body above or outwardly of the port 33 through which sealant is injected. More particularly, the port 4 is arranged opposite the reduced section of the purge ring 23, while the sealant injection port 33 is disposed opposite the ring 32 intermediate the inner and outer sections of the secondary packing assembly.

The ring 36 which is held down by the bolt 38 is thus supported on the upper end of the purge ring 23. In any case, its function is similar to that of the stuffing box of FIG. 2 in that it permits replacement of the outer packing assembly 35 supported above it while the valve remains in service. Purge fluid, on the other hand, is normally contained between the outer packing assembly and the upper section 30 of the secondary packing assembly 29. The primary purpose of the second packing assembly remains the same in that it permits sealant to be injected into the space between its sections 30 and 31 when the outer primary packing assembly is out of service.

In other respects, it will be understood that the stuffing box of FIG. 3 operates and functions in a manner similar to that of the stuffing box of FIG. 2. It will also be understood that purge fluid and sealant may be introduced into the stuffing box in a manner described in connection with FIGS. 1 and 2.

From the foregoing it will be seen that this invention is one well adapted to attain all of the ends and objects hereinabove set forth, together with other advantages which are obvious and which are inherent to the apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

What is claimed is:

1. A pressure vessel, comprising
   a body in which fluid may be contained under pressure, and
   a movable rod extending through a stuffing box mounted on the body to seal about the rod, said stuffing box including
   a first packing assembly at its inner end,
   a second packing assembly at its outer end,
   a third packing assembly intermediate the first and second packing assemblies and including axially spaced, inner and outer packing sections,
   a bleed ring intermediate the first and second packing assemblies and surrounding the rod with small clearance,
   means for yieldably engaging the outer end of the second packing assembly in order to axially compress the packing assemblies,
   means for limiting axially outward movement of the outer section of the third packing assembly section and injecting sealant between the sections in order to permit removal of the second packing assembly while the vessel is in service, and
   means for injecting purge fluid into the clearance between the bleed ring and the rod at a pressure above that of the fluid contained in the body.

2. A pressure vessel of the character defined in claim 1, wherein
   the bleed ring is outwardly of the third packing assembly.

3. A pressure vessel of the character defined in claim 1, wherein
   the bleed ring is inwardly of the third packing assembly.

4. A pressure vessel of the character defined in claim 1, wherein
   the means for injecting purge fluid includes
   a conduit for connecting the clearance with a source of purge fluid,
   valve means for opening and closing the conduit,
   means for controlling the pressure of the purge fluid from the source,
   means for restricting flow within the conduit intermediate the pressure controlling means and valve means, and
   means for measuring and indicating the pressure as well as the rate of flow within the conduit intermediate the flow restricting means and valve means.

5. A valve, comprising
   a valve body having a flow way therethrough,
   a closure member movable within the valve body between positions opening and closing the flow way, and
   a movable stem connected to the closure member and extending through a stuffing box mounted in the valve body,
   said stuffing including
   a first packing assembly at its inner end,
   a second packing assembly at its outer end,
   a third packing assembly intermediate the first and second packing assemblies and including axially spaced, inner and outer packing sections,
   a bleed ring intermediate the first and second packing assemblies and surrounding the stem with small clearance,
   means for yieldably engaging the outer end of the second packing assembly in order to axially compress the packing assemblies, means for limiting axially outward movement of the outer section of the third packing assembly section and injecting sealant between the sections in order to permit removal of the second packing assembly from the space while the valve is in service, and means for injecting purge fluid into the clearance between the bleed ring and the stem at a pressure above that of the fluid contained in the valve body.

6. A valve of the character defined in claim 5, wherein the bleed ring is outwardly of the third packing assembly.

7. A valve of the character defined in claim 5, wherein the bleed ring is inwardly of the third packing assembly.

8. A valve of the character defined in claim 5, the means for injecting purge fluid includes a conduit for connecting the clearance with a source of purge fluid, valve means for opening and closing the conduit, means for controlling the pressure of the purge fluid from the source, means for restricting flow within the conduit intermediate the pressure controlling means and valve means, means for measuring and indicating the pressure as well as the rate of flow within the conduit intermediate the flow restricting means and valve means.

* * * * *